(12) United States Patent
Nalwa

(10) Patent No.: US 6,285,365 B1
(45) Date of Patent: Sep. 4, 2001

(54) ICON REFERENCED PANORAMIC IMAGE DISPLAY

(75) Inventor: Vishvjit Singh Nalwa, Middletown, NJ (US)

(73) Assignee: FullView, Inc., Holmdel, NJ (US)

( * ) Notice: Subject to any disclaimer, the term of this patent is extended or adjusted under 35 U.S.C. 154(b) by 0 days.

(21) Appl. No.: 09/143,415

(22) Filed: Aug. 28, 1998

(51) Int. Cl.[7] ........................................... G06F 3/14

(52) U.S. Cl. .................. 345/348; 345/340; 345/341; 345/123

(58) Field of Search .................. 345/341, 123, 345/340, 348

(56) References Cited

U.S. PATENT DOCUMENTS

| | | | |
|---|---|---|---|
| 2,267,813 | 12/1941 | Buckner | 250/141 |
| 2,304,434 | 12/1942 | Ayres | 88/24 |
| 3,144,806 | 8/1964 | Smith | 88/16.6 |
| 3,286,590 | 11/1966 | Brueggemann | 88/24 |
| 3,420,605 | 1/1969 | Kipping | 352/69 |
| 3,506,344 | 4/1970 | Petit, Jr. | 352/69 |
| 3,740,469 | 6/1973 | Herndon | 178/6.8 |
| 3,998,532 | 12/1976 | Dykes | 352/69 |
| 4,078,860 | 3/1978 | Globus et al. | 352/69 |
| 4,355,328 | 10/1982 | Kulik | 358/87 |
| 4,357,081 | 11/1982 | Moddemeijer | 352/69 |
| 4,429,957 | 2/1984 | King | 350/423 |
| 4,766,429 | 8/1988 | Stapelton | 340/724 |
| 4,859,046 | 8/1989 | Traynor et al. | 350/627 |
| 4,890,314 | 12/1989 | Judd | 379/53 |
| 4,982,092 | 1/1991 | Johle | 250/332 |
| 4,985,762 | 1/1991 | Smith | 358/87 |
| 5,016,109 | 5/1991 | Gaylord | 358/225 |

(List continued on next page.)

FOREIGN PATENT DOCUMENTS

| | | |
|---|---|---|
| 37 39 697 | 12/1988 | (DE) . |
| 0 484801 a3 | 5/1992 | (EP) . |
| 0 519 774 | 12/1992 | (EP) . |
| 0 793 074 a1 | 9/1997 | (EP) . |
| 1528819 | 5/1968 | (FR) . |
| 60-20692 | 2/1985 | (JP) . |
| WO 92 14341 | 8/1992 | (WO) . |
| WO-A-93 2592723 | 12/1993 | (WO) . |
| WO 97/43854 | 11/1997 | (WO) . |

OTHER PUBLICATIONS

IEICE Transaction on Communications, vol. E77–B, No. 2, Feb. 1, 1994, pp. 232–238, XP000447116, Kazutake Uehira et al., "Seamless Image–Connection Technique For A Multiple–Sensor Camera," p. 233, col. 1, line 19—p 234, col. 1, line 14.

"Omnidirectional Imaging with Hyperboloidal Projection," by K. Yamazawa, et al, .us 1993 IEEE Intern'l Conference, Yokohama, Japan, Jul. 26–30, 1993, pp. 1029–1034.

Derwent Publication on DE 3930–774–A, "Projector for video colour picture."

"Panoramic Optics Give U.S. Tankers A Better Than Birdseye View," by D. Rees and M. Lisic, Industrial Photography, Apr. 1963, pp. 36, 37, and 69.

Starchild: Galaxies, XP002124075, Internet: URL:http://starchild.gsfc.nasa.gov/...w/universe_level1/galaxies.htlm.

*Primary Examiner*—Raymond J. Bayerl
*Assistant Examiner*—Thomas T. Nguyen
(74) *Attorney, Agent, or Firm*—Christopher N. Malvone

(57) ABSTRACT

Panoramic images are displayed with referencing icons that assist the user in conceptualizing the panoramic image as an unrolled cylindrical representation of a panoramic image. Icons above and below the image indicate a cylinder by their substantially elliptical shape. The icons also include left and right extensions with reference marks that give the impression of a cylindrical surface being unrolled. As a result, a user more readily understands the relationship between objects in different parts of the panoramic image.

34 Claims, 3 Drawing Sheets

U.S. PATENT DOCUMENTS

| | | | |
|---|---|---|---|
| 5,023,725 | 6/1991 | McCutchen | 358/231 |
| 5,030,823 | 7/1991 | Obdeijn | 250/223 |
| 5,040,055 | 8/1991 | Smith | 358/87 |
| 5,130,794 | 7/1992 | Ritchey | 358/87 |
| 5,179,440 | 1/1993 | Loban | 358/87 |
| 5,187,571 | 2/1993 | Bruan et al. | 358/85 |
| 5,194,959 | 3/1993 | Kaneko et al. | 358/225 |
| 5,236,199 | 8/1993 | Thompson, Jr. | 273/439 |
| 5,245,175 | 9/1993 | Inabata | 250/201.8 |
| 5,264,945 | 11/1993 | Kannegundla et al. | 358/444 |
| 5,305,029 | 4/1994 | Yoshida et al. | 353/37 |
| 5,452,135 | 9/1995 | Maki et al. | 359/834 |
| 5,495,576 | 2/1996 | Ritchey | 395/125 |
| 5,526,133 | 6/1996 | Paff | 358/335 |
| 5,539,483 | 7/1996 | Nalwa | 353/94 |
| 5,619,255 | 4/1997 | Booth | 348/36 |
| 5,684,626 | 11/1997 | Greenberg | 359/388 |
| 5,708,469 | 1/1998 | Herzberg | 348/39 |
| 5,745,126 * | 4/1998 | Jain et al. | 348/42 |
| 5,745,305 | 4/1998 | Nalwa | 359/725 |
| 5,748,194 * | 5/1998 | Chen | 345/427 |
| 5,771,041 * | 6/1998 | Small | 345/326 |
| 5,782,766 * | 7/1998 | Weng et al. | 600/443 |
| 5,793,527 * | 8/1998 | Nalwa | 359/403 |
| 5,958,012 * | 9/1999 | Battat et al. | 709/224 |
| 5,990,934 * | 11/1999 | Nalwa | 348/36 |
| 6,111,702 * | 8/2000 | Nalwa | 359/725 |
| 6,115,176 * | 9/2000 | Nalwa | 359/403 |

* cited by examiner

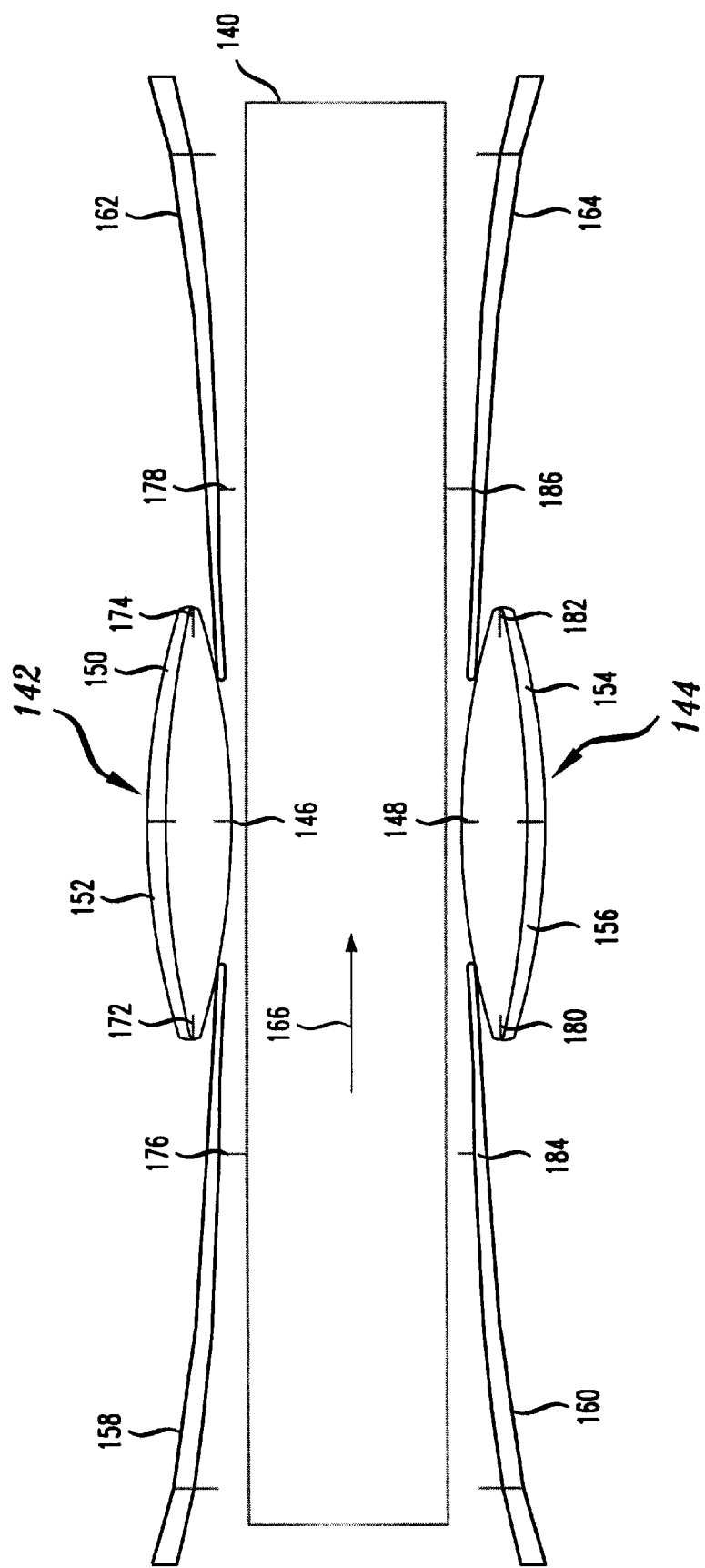

ICON REFERENCED PANORAMIC IMAGE DISPLAY

CROSS REFERENCE TO RELATED INVENTION

This application is related to commonly assigned and concurrently filed U.S. patent application entitled "Split Mirrored Panoramic Image Display."

BACKGROUND OF THE INVENTION

1. Field of the Invention

The present invention relates to displays; more particularly, panoramic displays.

2. Description of the Related Art

In the past, panoramic images were displayed as a single rolled out panoramic display. FIG. 1 illustrates such a display. FIG. 1 can be thought of as a cylindrical panoramic view that is unrolled on a display. Unfortunately, such a display is disorienting to a user. For example, a user who is looking in the direction indicated by arrow 10 does not get a clear understanding of how the view 180 degrees away from arrow 10 appears. As a result, there is a need for a display that more clearly shows panoramic images.

SUMMARY OF THE INVENTION

The present invention solves the aforementioned problems by displaying panoramic images with referencing icons that assist the user in conceptualizing the panoramic image as an unrolled cylindrical representation of a panoramic image. Icons above and below the image indicate a cylinder by their substantially elliptical shape. The icons also include left and right extensions with reference marks that give the impression of a cylindrical surface being unrolled. As a result, a user more readily understands the relationship between objects in different parts of the panoramic image.

BRIEF DESCRIPTION OF THE DRAWINGS

FIG. 5 illustrates a one part panoramic display with an icon.

DETAILED DESCRIPTION OF THE INVENTION

Figure 1:
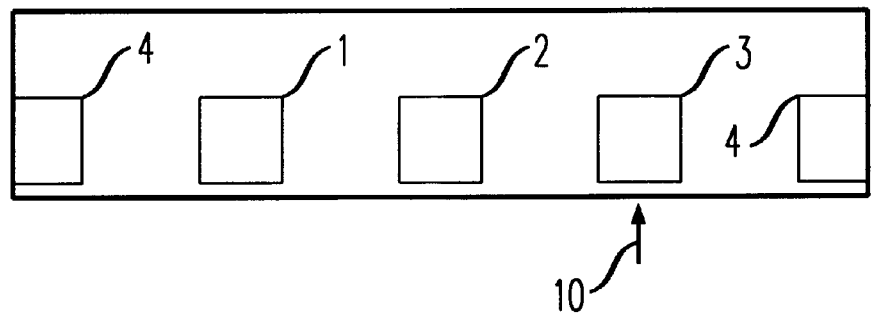
FIG. 1 illustrates a prior art panoramic display.
Figure 2:
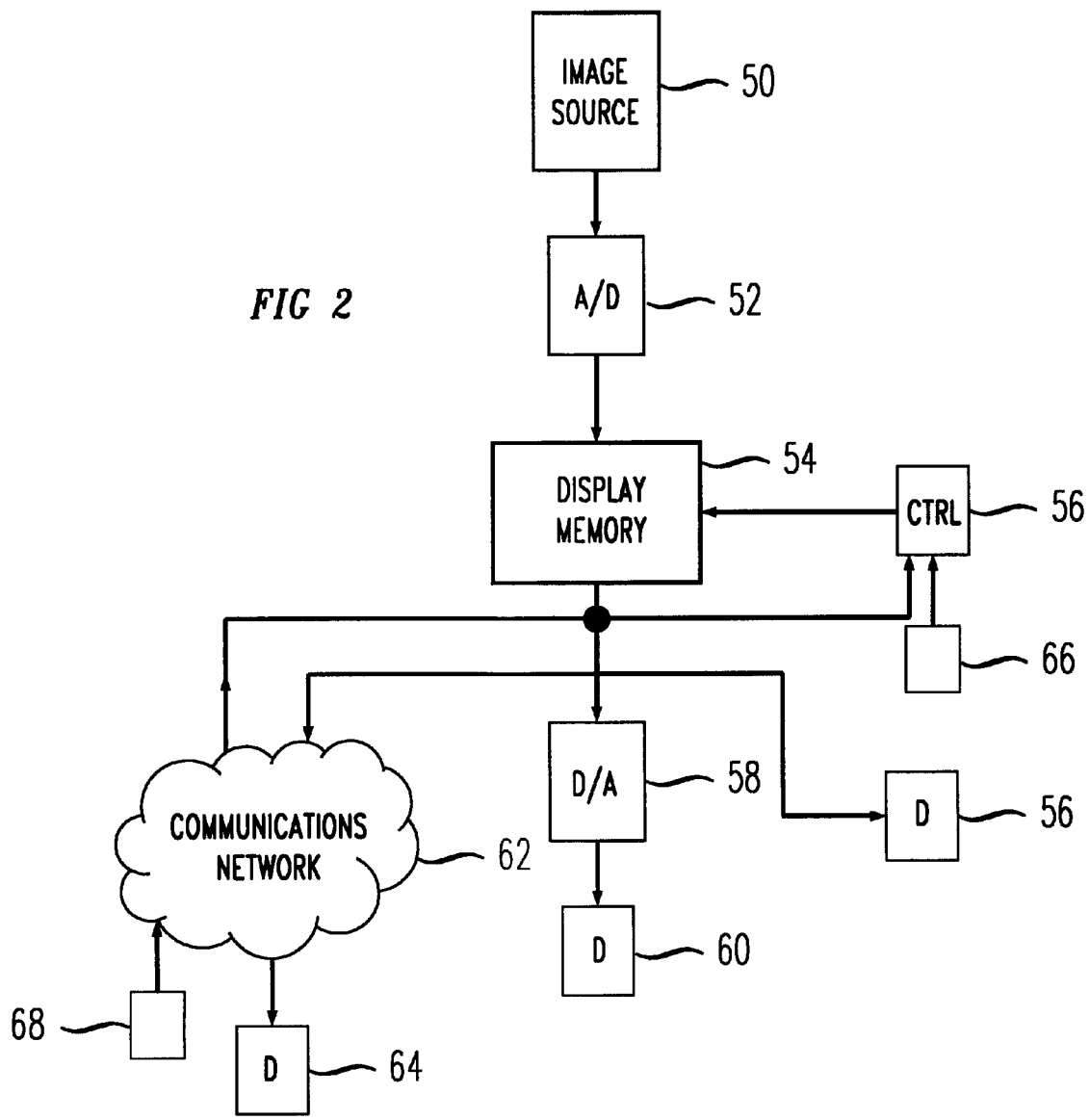
FIG. 2 illustrates a block diagram of a display system.

FIG. 2 illustrates a block diagram of a panoramic viewing system using the display of FIG. 5. Panoramic image source or camera 50 provides panoramic signals representative of a panoramic view to analog to digital converter 52. Analog to digital converter 52 provides data representative of the panoramic view to display memory 54. Display memory 54 stores the image data using addressing provided by controller 56. Controller 56 may be a microprocessor or a microcontroller. When image data is provided to a user for display, addressing is provided by controller 56. Controller 56 provides the read addressing based on the viewing direction selected by a user. It is also possible for a random direction of view to be selected, and for controller 56 to provide read addressing to display memory 54 in order to read out data in accordance with the random viewing direction. If display device 56 has a digital input the panoramic image data read from display memory 54 may be provided to display device 56 directly. Digital to analog converter 58 is used to provide image signals to analog display devices such as display device 60. It is also possible to send the panoramic image data over communication network 62 to a distant display device 64. Since it is possible for a user to select the direction of view, the user input may be provided by, for example, joystick 66 or joystick 68, where joystick 68 provides user input via communication network 62.

Figure 3:
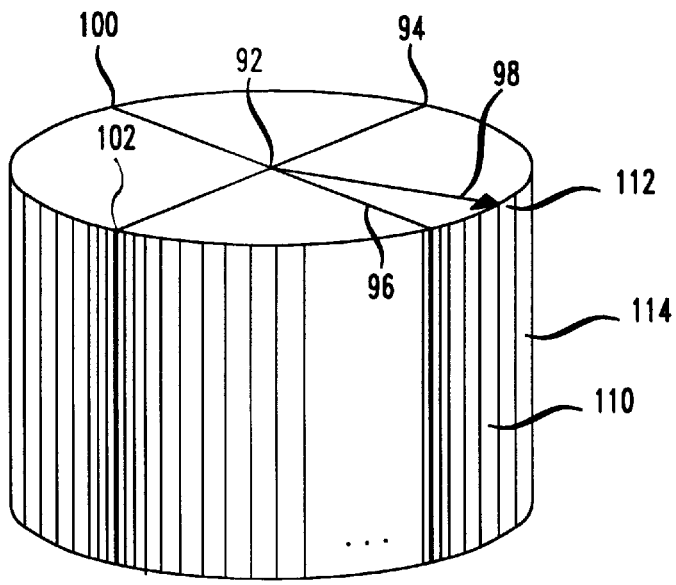
FIG. 3 illustrates the relationship between image data and a viewing direction.

FIG. 3 is a cylindrical representation of a panoramic image that illustrates the relationship between the direction of view and image data comprising the panoramic image. The data can be thought of as columns of data representative of pixels that form a cylinder around a central point 92. For example, the columns between reference lines 94 and 96 can be thought of as columns of image data representative of pixels obtained from the direction of arrow 98 with a 45 degree field of view on each side of the arrow.

Figure 4:
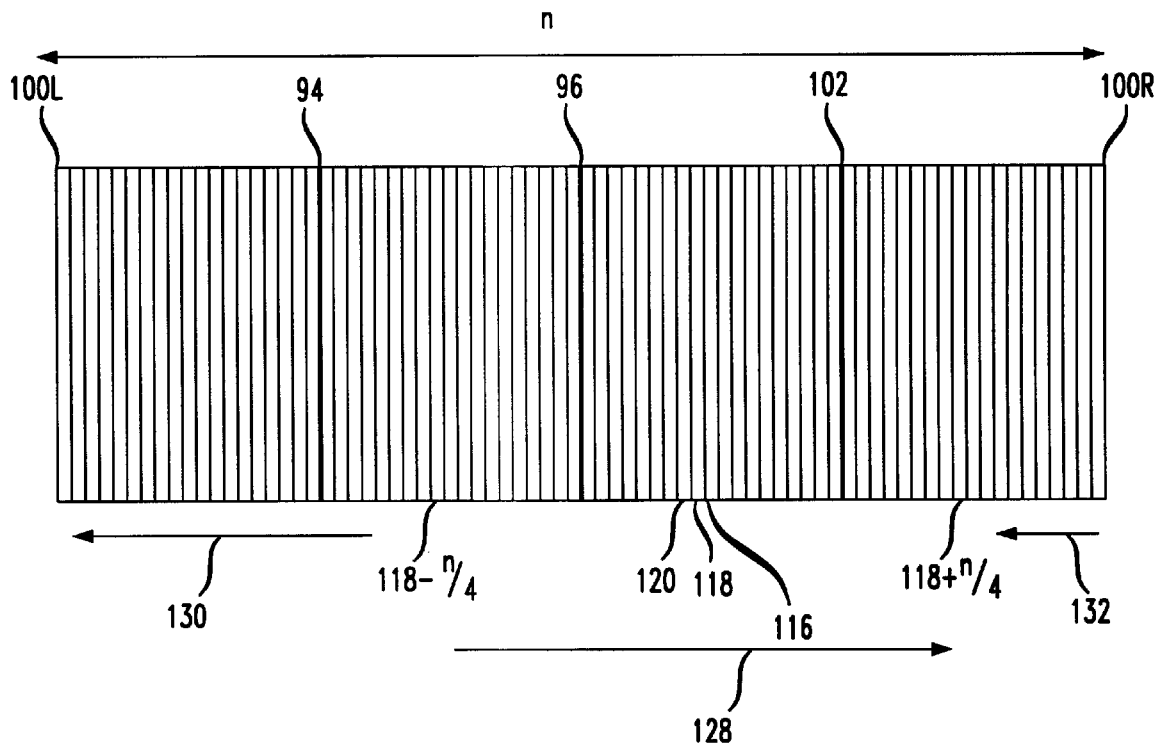
FIG. 4 illustrates a memory structure used to store image data.

FIG. 4 illustrates the structure of display memory 54 where the image data discussed with regard to FIG. 3 is stored. For the sake of clarity, reference lines 94, 96, 100L, 100R and 102 are provided to show the relationship between the section of the cylinder in FIG. 4 and the sections of memory in FIG. 4. (100L and 100R can be thought of as the left and right portions of line 100 of FIG. 3, respectively.) The data corresponding to the columns of FIG. 3 is written into the columns of FIG. 4. For example, the data corresponding to columns 110, 112 and 114 of FIG. 3 is written into columns 116, 118 and 120 of FIG. 4, respectively. This process is repeated for all the columns of data from FIG. 3.

Once the data is stored in display memory 54 as illustrated in FIG. 4, controller 56 produces the addressing for reading the data from the memory for display in accordance with a user input.

The image data is displayed on display area as illustrated in FIG. 5, which shows single display area 140 with adjacent upper and lower substantially elliptical icons 142 and 144, respectively. Mark 146 of upper icon 142, and mark 148 of lower icon 144 indicate the direction of view selected by a user. It is particularly helpful if right portion 150 and left portion 152 of upper icon 142 have different colors, shades or cross hatching. It is also helpful if right portion 154 of icon 144 has the same color, shading or cross hatching as right portion 150 of icon 142, and if left portion 156 of icon 144 has the same color, shading or cross hatching as left portion 152 of icon 142. A panoramic image may be thought of as a cylindrical image that is unrolled. The user is assisted with this conceptualization by icons 142 and 144. To indicate that a panoramic image is being unrolled from a cylinder represented by icons 142 and 144, portion 158 of upper icon 142 stretches out to the left and may be the same color, shading or cross hatching as portion 152. Likewise, portion 160 of icon 144 stretches out to the left and may be the same color, shading or cross hatching as portion 156. In a similar fashion, right portion 162 of icon 142 stretches out to the right and may be the same color, shading or cross hatching as portion 150, and portion 164 of icon 144 stretches out to the right and may be the same color, shading or cross hatching as portion 154. These colors and graphics help orient a viewer within the panoramic image of display area 140.

Referring back to FIG. 4 and recalling that column 118 corresponds to data at the center of the selected view, data corresponding to column 118 is provided at a position indicated by marks 146 and 148. The image data is provided to display area 140 starting with providing data from column 118−n/2 to the far left of the display area and continuing in the direction of arrow 166 as additional columns of data are read from the memory. When right position 100R is reached in the memory, the addressing rolls over and begins once again at column 100L and continues until all of the data is provided to the display area. It might be desirable to continue the image display beyond 118±n/2 so that more than 360 degrees is displayed.

It is also possible to include reference marks 172 and 174 in upper icon 142. Reference mark 172 corresponds to reference mark 176 in icon portion 158 and reference mark 174 corresponds to reference mark 178 in icon portion 162. Likewise, lower icon 144 includes reference marks 180 and 182. Reference mark 180 corresponds to reference mark 184 in icon portion 160 and reference mark 182 corresponds to reference mark 186 in icon portion 164. These sets of reference marks further help orient a user in the panoramic display by indicating that marks 172 and 180 of the cylindrical representation of the panoramic image correspond to marks 176 and 184 of the unrolled representation. Similarly, marks 174 and 182 of the cylindrical representation correspond to marks 178 and 186 of the unrolled representation.

What is claimed is:

1. A method for displaying a panoramic image, comprising the steps of:
    displaying at least a portion of the panoramic image on a display area; and
    displaying a substantially elliptical icon adjacent to the portion of the panoramic image
wherein the substantially elliptical icon comprises at least one reference mark that corresponds to at least one mark associated with the panoramic image.

2. The method of claim 1, wherein the substantially elliptical icon is above the portion of the panoramic image.

3. The method of claim 2, wherein a left portion of the substantially elliptical icon has a different appearance than a right portion of the substantially elliptical icon.

4. The method of claim 3, wherein the different appearance is a difference in color.

5. The method of claim 3, wherein the different appearance is a difference in shading.

6. The method of claim 3, wherein the different appearance is a difference in cross hatching.

7. The method of claim 1, wherein the substantially elliptical icon is below the portion of the panoramic image.

8. The method of claim 7, wherein a left portion of the substantially elliptical icon has a different appearance than a right portion of the substantially elliptical icon.

9. The method of claim 8, wherein the different appearance is a difference in color.

10. The method of claim 8, wherein the different appearance is a difference in shading.

11. The method of claim 8, wherein the different appearance is a difference in cross hatching.

12. A method for displaying a panoramic image, comprising the steps of:
    displaying at least a portion of the panoramic image on a display area; and
    displaying a substantially elliptical icon adjacent to the portion of the panoramic image,
    wherein the substantially elliptical icon is above the portion of the panoramic image and
wherein the substantially elliptical icon has a left extension portion and a right extension portion.

13. The method of claim 12, wherein the left and right extension portions have a different appearance.

14. The method of claim 13, wherein the different appearance is a difference in color.

15. The method of claim 13, wherein the different appearance is a difference in shading.

16. The method of claim 13, wherein the different appearance is a difference in cross hatching.

17. A method for displaying a panoramic image, comprising the steps of:
    displaying at least a portion of the panoramic image on a display area; and
    displaying a substantially elliptical icon adjacent to the portion of the panoramic image,
    wherein the substantially elliptical icon is above the portion of the panoramic image,
    wherein a left portion of the substantially elliptical icon has a different appearance than a right portion of the substantially elliptical icon and wherein the substantially elliptical icon has a left extension portion and a right extension portion.

18. The method of claim 17, wherein the left portion and the left extension portion of the substantially elliptical icon have a different appearance than the right portion and the right extension portion of the substantially elliptical icon.

19. The method of claim 18, wherein the different appearance is a difference in color.

20. The method of claim 18, wherein the different appearance is a difference in shading.

21. The method of claim 18, wherein the different appearance is a difference in cross hatching.

22. A method for displaying a panoramic image, comprising the steps of:
    displaying at least a portion of the panoramic image on a display area; and
    displaying a substantially elliptical icon adjacent to the portion of the panoramic image,
    wherein the substantially elliptical icon is below the portion of the panoramic image and
wherein the substantially elliptical icon has a left extension portion and a right extension portion.

23. The method of claim 22, wherein the left and right extension portions have a different appearance.

24. The method of claim 23, wherein the different appearance is a difference in color.

25. The method of claim 23, wherein the different appearance is a difference in shading.

26. The method of claim 23, wherein the different appearance is a difference in cross hatching.

27. A method for displaying a panoramic image, comprising the steps of:
    displaying at least a portion of the panoramic image on a display area; and
    displaying a substantially elliptical icon adjacent to the portion of the panoramic image,
    wherein the substantially elliptical icon is below the portion of the panoramic image,
    wherein a left portion of the substantially elliptical icon has a different appearance than a right portion of the substantially elliptical icon and wherein the substantially elliptical icon has a left extension portion and a right extension portion.

28. The method of claim 27, wherein the left portion and the left extension portion of the substantially elliptical icon have a different appearance than the right portion and the right extension portion of the substantially elliptical icon.

29. The method of claim 28, wherein the different appearance is a difference in color.

30. The method of claim 28, wherein the different appearance is a difference in shading.

31. The method of claim 28, wherein the different appearance is a difference in cross hatching.

32. A method for displaying a panoramic image, comprising the steps of:

displaying at least a portion of the panoramic image on a display area;

displaying a first substantially elliptical icon above the portion of the panoramic image; and displaying a second substantially elliptical icon below the portion of the panoramic image wherein at least one of the first and second substantially elliptical icons comprises at least one reference mark that corresponds to at least one mark associated with the panoramic image.

33. A method for displaying a panoramic image, comprising the steps of:

displaying at least a portion of the panoramic image on a display area;

displaying a first substantially elliptical icon above the portion of the panoramic image; and displaying a second substantially elliptical icon below the portion of the panoramic image, wherein the first substantially elliptical icon has a first left extension portion and a first right extension portion, and the second substantially elliptical icon has a second left extension portion and a second right extension portion.

34. The method of claim 33, wherein a first left portion and the first left extension portion of the first substantially elliptical icon, and a second left portion and the second left extension portion of the second substantially elliptical icon have a different appearance than a first right portion and the first right extension portion of the first substantially elliptical icon, and a second right portion and the second right extension portion of the second substantially elliptical icon.

\* \* \* \* \*